No. 770,987. PATENTED SEPT. 27, 1904.
C. SPIEGEL & H. MOEHRING.
ELASTIC WASHER FOR RAIL JOINTS.
APPLICATION FILED DEC. 8, 1903.
NO MODEL.

Witnesses.

Inventors:
Charles Spiegel
Hermann Moehring
By 
their Attorneys.

No. 770,987.                                            Patented September 27, 1904.

UNITED STATES PATENT OFFICE.

CHARLES SPIEGEL AND HERMANN MOEHRING, OF ST. PETERSBURG, RUSSIA.

ELASTIC WASHER FOR RAIL-JOINTS.

SPECIFICATION forming part of Letters Patent No. 770,987, dated September 27, 1904.

Application filed December 8, 1903. Serial No. 184,349. (No model.)

*To all whom it may concern:*

Be it known that we, CHARLES SPIEGEL, a subject of the Emperor of Russia, and HERMANN MOEHRING, a subject of the Emperor of Germany, residing at St. Petersburg, Russia, have invented certain new and useful Improvements in Elastic Washers for Rail-Joints, of which the following is a specification.

Our invention has for its object a washer which, in joining the rails by bolts, is intended to secure a perfect fastening of the nuts in the proper position.

Figure 1:
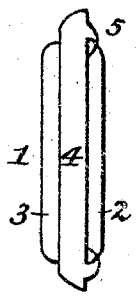
Figure 2:
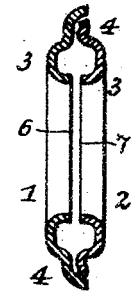
Figure 2:
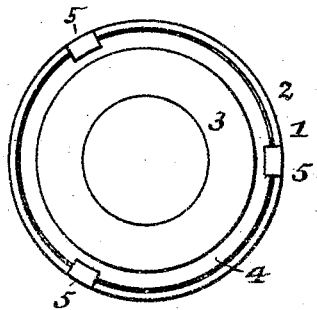
Figure 3:

In the accompanying drawings, Figure 1 is a side elevation of the double-springing washer. Fig. 2 is a longitudinal section taken through the same, and Fig. 3 is a front view of the washer.

The washer consists of two flat rings 1 2, manufactured by stamping from spring-steel, each of them being provided with two concentric flanges 3 4. The flanges 4 have portions extending at substantially right angles therefrom. These portions on the ring 1 are longer than those on ring 2 and are curved slightly, so as to overlap those on ring 2. 5 represents clamps on the projecting portion of ring 1, and these clamps project over the flange of ring 2 and hold said ring in place. When tightening the nut, these edges are approaching; but even after they have come in contact the washer is still springing—*i. e.*, its elasticity is not discontinued. This fact secures the steadiness of the bolt-joint, as the considerable friction generated between the washer and the nut prevents the latter from unscrewing.

We claim—

1. A washer composed of two flat rings, each of said rings consisting of two concentric flanges of variable height, one of said flanges having a right-angular extension, the flange of one ring overlapping the flange of the other, substantially as described.

2. A washer composed of two flat rings, each of said rings consisting of inner and outer flanges, said outer flanges having right-angular extensions, the extension of the flange of one ring overlapping the extension of the flange of the other, substantially as described.

3. A washer composed of two flat rings, each of said rings consisting of inner and outer flanges, said outer flanges having right-angular extensions, the extension of the flange on one ring overlapping the extension of the flange on the other ring and means for fastening the rings together, substantially as described.

4. A washer composed of two springy rings, consisting of inner and outer flanges, the outer flange of one ring having right-angular projection overlapping the outer flange of the other ring, substantially as described.

5. A washer composed of two springy rings, consisting of inner and outer flanges, the outer flange of one ring having right-angular projection overlapping the outer flange of the other ring and means on said overlapping flange fastening the rings together, substantially as described.

In witness whereof we have hereunto set our hands in presence of two witnesses.

CHARLES SPIEGEL.
HERMANN MOEHRING.

Witnesses:
N. TSCHEKALOFF,
G. PICHARD.